United States Patent
Sugawara

(10) Patent No.: US 9,876,432 B2
(45) Date of Patent: Jan. 23, 2018

(54) SWITCHING POWER SUPPLY DEVICE

(71) Applicant: Fuji Electric Co., Ltd., Kanagawa (JP)

(72) Inventor: Takato Sugawara, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/584,347

(22) Filed: May 2, 2017

(65) Prior Publication Data
US 2017/0366090 A1    Dec. 21, 2017

(30) Foreign Application Priority Data

Jun. 16, 2016 (JP) ................. 2016-119685

(51) Int. Cl.
| | |
|---|---|
| *H02M 3/335* | (2006.01) |
| *H02M 3/158* | (2006.01) |
| *H02M 1/42* | (2007.01) |
| *H02M 3/156* | (2006.01) |

(52) U.S. Cl.
CPC ..... *H02M 3/33507* (2013.01); *H02M 1/4258* (2013.01); *H02M 3/158* (2013.01); *H02M 3/33569* (2013.01); *H02M 1/4225* (2013.01); *H02M 3/156* (2013.01); *H02M 3/1588* (2013.01)

(58) Field of Classification Search
CPC ........... H02M 3/33507; H02M 1/4258; H02M 3/158; H02M 3/33569; H02M 1/4225; H02M 3/1588
See application file for complete search history.

(56) References Cited

U.S. PATENT DOCUMENTS

| | | | |
|---|---|---|---|
| 9,077,251 B2 | 7/2015 | Maruyama | |
| 9,099,925 B2 | 8/2015 | Sugawara | |
| 2004/0263140 A1* | 12/2004 | Adragna | G05F 1/70 323/282 |
| 2007/0063684 A1* | 3/2007 | Adragna | H02M 1/32 323/284 |
| 2009/0097284 A1* | 4/2009 | Takei | H02M 1/32 363/56.1 |
| 2010/0110593 A1* | 5/2010 | Kim | H02M 1/32 361/18 |
| 2010/0165683 A1* | 7/2010 | Sugawara | H02M 1/4225 363/126 |
| 2012/0201063 A1* | 8/2012 | Sugawara | H02M 1/4225 363/89 |

(Continued)

FOREIGN PATENT DOCUMENTS

| | | |
|---|---|---|
| JP | 2014-23208 A | 2/2014 |
| JP | 2014-82924 A | 5/2014 |

*Primary Examiner* — Fred E Finch, III
*Assistant Examiner* — Demetries A Gibson
(74) *Attorney, Agent, or Firm* — Chen Yoshimura LLP

(57) ABSTRACT

The present invention provides, in one aspect, a restart timer that turns a switching element ON when it is not possible to turn the switching element ON via a zero-current detection and frequency reduction part, and specifically includes: a frequency reduction part that reduces a switching frequency of the switching element by delaying the turn-ON timing of the switching element by the zero-current detection and frequency reduction part when a light load state is detected; and a timer adjustment part that lengthens the restart time of the restart timer by synchronizing with the turn-ON timing of the switching element that was delayed by the frequency reduction part.

9 Claims, 13 Drawing Sheets

(56) References Cited

U.S. PATENT DOCUMENTS

| | | | |
|---|---|---|---|
| 2012/0250362 A1* | 10/2012 | Chen | H02M 1/4258 363/21.03 |
| 2014/0085949 A1* | 3/2014 | Sugawara | H02M 1/4225 363/89 |
| 2016/0181942 A1* | 6/2016 | Sugawara | H02M 3/156 363/126 |

* cited by examiner

FIG. 8A
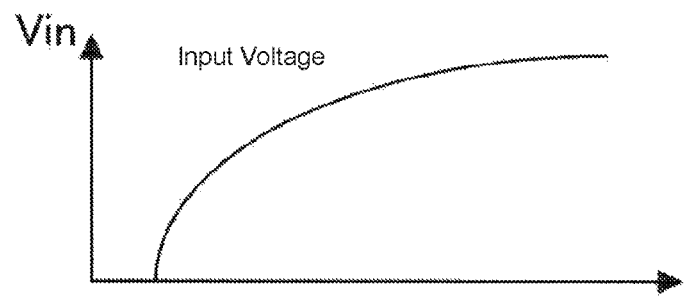
FIG. 8B
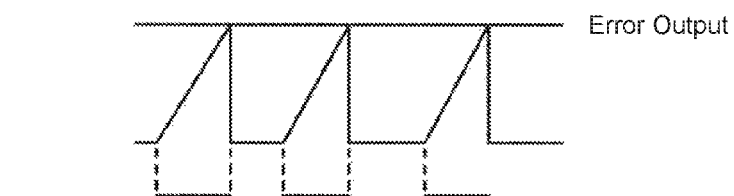
FIG. 8C
FIG. 8D
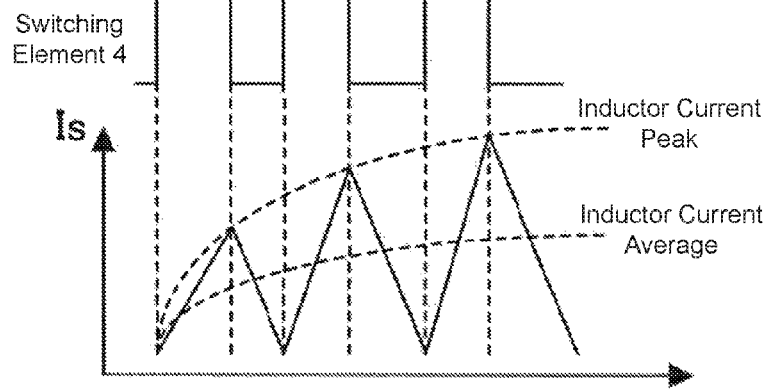

SWITCHING POWER SUPPLY DEVICE

BACKGROUND OF THE INVENTION

Technical Field

The present invention relates to a switching power supply device that includes a function that improves the power factor by reducing the switching frequency when the load is light, and particularly relates to a switching power supply device that is able to prevent a decrease in the power factor even when it is not possible to determine the turn-ON timing of a switching element via zero current detection when operating at a reduced frequency.

Background Art

Patent Documents 1, 2, and the like, for example, introduce in detail, from among quasi-resonant switching power supply devices that generate a prescribed output direct current voltage Vout by switching an input voltage Vin, switching power supply devices that include a power factor correction function that improves the power factor when the load is light in particular.

FIG. 7 is a schematic configuration diagram that shows one example of a switching power supply device 1 that includes this type of power factor correction function. As shown schematically, this switching power supply device 1 includes an inductor 3 of which one end is connected to a diode bridge circuit 2 that performs full-wave rectification on an input alternating current voltage AC. The switching power supply device 1 further includes a switching element 4 that is connected to the other end of the inductor 3 and that forms a current path with the diode bridge circuit 2 through the inductor 3 when the switching element 4 is ON. This switching element 4 is formed of a MOSFET, for example.

The switching power supply device 1 further includes a diode 5 that is connected to the other end of the inductor 3 and that forms a current path between the inductor 3 and an output capacitor 6 when the switching element 4 is OFF, thereby achieving the prescribed output direct current voltage Vout to the output capacitor 6. In this manner, the output direct current voltage Vout, which is generated as a charging voltage of the output capacitor 6, is provided to the load of an electronic device or the like (not shown) via an output terminal 7. The main body of a step-up switching power supply device that obtains an output direct current voltage Vout of approximately 400V from an input alternating current voltage AC of 100V, for example, may be constructed using the above-described configuration in which a quasi-resonant circuit was formed with the inductor 3 and the switching element 4 being the main components thereof. FIG. 9 shows an input capacitor that is connected to a rectified output end of the diode bridge circuit 2.

Describing the operation of this circuit in a simple manner, energy is stored in the inductor 3 as a result of the current flowing to the inductor 3 increasing when the switching element 4 is turned ON. When the switching element 4 is turned OFF, current flows from the inductor 3 to the output capacitor 6 as a result of the diode 5 being conductive, and the energy stored in the inductor 3 is released to the output side. At such time, the current flowing to the inductor 3 continually decreases, and when the current flowing to the inductor 3 reaches zero, the diode 5 blocks the path. This leads to the start of the resonance (quasi-resonance) operation of the quasi-resonant circuit that is formed of the inductor 3 and the capacitance (parasitic capacitance of the switching element 4 or an external capacitance (not shown)) between the source and drain of the switching element 4. As a result of this resonance operation, the drain terminal of the switching element 4 (the terminal on the side that connects to the inductor 3) decreases, and it is possible to achieve zero voltage switching if the switching element 4 is turned ON when this voltage becomes zero. It is possible to indirectly detect when the voltage of the drain terminal of the switching element 4 reaches zero by using the voltage of a ZCD terminal.

A control circuit (control IC) 10, in which various functions have been integrated, basically has the role of controlling the current flowing to the inductor 3 by driving the ON/OFF of the switching element 4. Specifically, the control circuit 10 detects a feedback voltage Vfb that corresponds to the output direct current voltage Vout via voltage-dividing resistors R4, R5 that are connected in parallel to the output terminal 7, and inputs this feedback voltage Vfb via a terminal FB. The control circuit 10 then acquires an error signal, in which the difference between the feedback voltage Vfb and a prescribed reference voltage Vref has been amplified, at an error detector 11, and then controls the ON/OFF of the switching element 4 in accordance with the error signal from the error detector 11. The error detector 11 is formed of a transconductance amp, for example.

The control circuit 10 includes a comparator (overvoltage detector) 12 that detects overvoltage by comparing the feedback voltage Vfb input via the terminal FB and a prescribed reference voltage Vovp. The control circuit 10 further includes a comparator (overcurrent detector) 13 that detects overcurrent by comparing a voltage (current detection voltage) Vis input via a terminal IS and a prescribed reference voltage Vovc. The voltage (current detection voltage) Vis input via the terminal IS corresponds to the current that flows to the switching element 4, and is thus detected via a resistor R3 connected in series to the source of the switching element 4. The control circuit 10 further includes a comparator (a zero current detector) 14 that detects zero current by comparing a prescribed reference voltage Vzcd and a coil voltage that is generated by an auxiliary coil 8 of the inductor 3 in accordance with the current flowing to the inductor 3 and is then input at the terminal ZCD via a resistor R2. The coil voltage is a voltage generated in the auxiliary coil 8 of the inductor 3 in accordance with the current flowing to the inductor 3.

Meanwhile, a comparator (PWM modulator; ON width control part) 15 compares a sawtooth wave generated by an oscillator 16 and the error signal (a signal in which the difference between the feedback voltage Vfb and the reference voltage Vref has been amplified) output from the error detector 11. When the error signal exceeds the level of the sawtooth wave, the comparator 15 switches the output thereof to "H," and resets a flip-flop 18 via an OR circuit 17a. The flip-flop 18 has the role of driving a driver circuit (not shown) that turns the switching element 4 ON/OFF.

The flip-flop 18 is set by inputting, via an OR circuit 17b, a signal S6 output by a frequency reduction circuit 20, which will be explained later, or a signal S7 output by a restart timer 40, which will be explained later. The restart timer 40 has the role of, in place of the frequency reduction circuit 20, continuously turning the switching element 4 ON/OFF in the manner described later by setting the flip-flop 18. The frequency reduction circuit 20 and the restart timer 40 respectively operate by detecting a signal S5 output by the comparator 14. In addition, the oscillator 16 generates a sawtooth wave using a signal S4 output by the OR circuit 17b as a trigger.

The switching element 4 is ON-OFF controlled by inputting a signal 51 that is from the flip-flop 18 and that is output via an output terminal OUT. Specifically, the flip-flop 18 controls the gate voltage of the switching element 4 via a driver circuit (not shown) using a setting output of the flip-flop 18. As a result, the switching element 4 turns ON when the flip-flop 18 is set. Furthermore, the switching element 4 turns OFF when the flip-flop 18 is reset. The switching element 4 performs switching by repeatedly performing such an ON/OFF operation, and generates the output direct current voltage Vout via the inductor 3.

When the switching element 4 is ON, the comparator 15 has the role of controlling the ON width of the switching element 4 by resetting the flip-flop 18 every time an error signal (error voltage) Verr exceeds the level of the sawtooth wave generated by the oscillator 16. In addition, when the signal S4 that sets the flip-flop 18 is input, the oscillator 16 resets the generation of the sawtooth wave and resumes the generation of the sawtooth wave from the initial state. The ON-OFF cycle (switching frequency) of the switching element 4 is controlled by the timing of the generation of the sawtooth wave of the oscillator 16.

A resistor R1, which is connected to a terminal RT, adjusts the slope of the sawtooth wave generated by the oscillator 16. In addition, a resistor R6 and capacitors C1, C2, which are connected to a terminal COMP, are a phase adjustment circuit for the output of the error detector 11. The flip-flop 18 is not only reset by the output of the comparator 15, but is also forcibly reset via the OR circuit 17a when an overcurrent is detected by the comparator 13 and an overvoltage is detected by the comparator 12.

According to the switching power supply device 1 configured in the manner described above, fundamentally, when the weight of the load connected to the output terminal 7 is fixed, the error signal is fixed and the switching of the switching element 4 is controlled at a fixed ON width. However, the input voltage Vin is a voltage in which the input alternating current voltage AC has been full-wave rectified via the diode bridge circuit 2. Thus, as shown in FIG. 8A, the voltage applied at both ends of the inductor 3 changes in accordance with the phase angle of the input voltage Vin.

Specifically, the comparator 15, as shown in FIG. 8B, basically compares the error signal and the sawtooth wave generated by the oscillator 16, and then, as shown in FIG. 8C, performs ON-OFF control of the switching element 4 in accordance with the comparison results. At such time, the slope of the current (inductor current Is) that flows to the inductor 3 when the switching element 4 is ON changes, as shown in FIG. 8D, depending on the phase angle of the input voltage Vin. The peak value of the inductor current Is, or in other words, the current value when the switching element 4 is turned OFF, changes following the alternating current waveform that corresponds to changes in the input voltage Vin.

As a result, when the switching element 4 is turned OFF, there is a lag in the time it takes for the current flowing to the inductor 3 to reach zero ("0"). Despite this, when the switching element 4 is ON-OFF controlled at a fixed cycle (frequency), the switching element 4 will be turned ON when voltage is applied to the switching element 4. In such a case, large switching losses will undoubtedly occur in the switching element 4.

The zero current detection performed by the comparator 14, which was described earlier, has the role (zero current switching) of reducing losses in the switching element 4 due to changes in the peak value of the above-mentioned inductor current Is by detecting when the current flowing to the inductor 3 reaches zero ("0") after the switching element 4 has been turned OFF, and then turning the switching element 4 ON.

The restart timer 40 includes, as shown in FIG. 9, for example, a switch element 42 that receives, via an inverter circuit 41, the signal S5 output by the comparator (zero current detector) 14 and then performs an OFF operation. The switch element 42 is formed of an nMOSFET, for example. The switch element 42 normally short-circuits a capacitor 44, and as shown in FIG. 10, initiates the charging of the capacitor 44 via a constant-current source 43 by performing an OFF operation when an H (high) level signal S5 is received. When this happens, the charging voltage of the capacitor 44 increases at a slope that is in accordance with the size of the charging current from the constant-current source 43, and this charging voltage is output to the OR circuit 17b as the signal S7. The OR circuit 17b performs a switching operation and treats the signal S7 as a restart signal when the level (charging voltage) of the signal S7 exceeds a threshold voltage for the input terminal of the OR circuit 17b.

During the above-mentioned switching control, the ON width of the switching element 4 becomes shorter as the load becomes lighter, leading to an increase in a switching frequency Fc, as has been previously mentioned. When the switching frequency Fc increases, there is an increase in the losses at the switching element 4; thus, in the conventional switching power supply device 1, only control that restricts the maximum frequency of the switching frequency Fc is carried out. Specifically, by delaying the turn-ON timing of the switching element 4 by a fixed amount of time when the load is light, the switching frequency Fc is kept at or below the maximum operational frequency, which prevents decreases in efficiency.

However, power factor correction control carried out by restricting the maximum frequency of the switching frequency Fc has the following problems. That is, during the ON/OFF control of the switching element 4 described above, the size of the inductor current Is is controlled in accordance with the phase angle of the input voltage Vin. Thus, the smaller the phase angle of the input voltage Vin is, the smaller the inductor current Is becomes. In particular, when the above-described maximum frequency restriction of the switching frequency Fc is applied when the load is light, the effect of the maximum frequency restriction becomes larger as the phase angle of the input voltage Vin becomes smaller, and it becomes more difficult for the inductor current Is to flow, leading to distortions in the input current waveform. When this happens, a new problem occurs in which the power factor decreases when the phase angle of the input voltage Vin is small as a result of these distortions in the current waveform.

In order to avoid such problems, Patent Document 1 discloses a configuration in which the switching frequency Fc is reduced using a different method when the load becomes light. This reduction control of the switching frequency Fc is implemented via the frequency reduction circuit 20. The frequency reduction circuit 20 delays the turn-ON timing of the switching element 4 by changing the number of times that zero current detection is performed by the comparator 14 in accordance with the weight of the load. Since the number of times that zero current detection is carried out is the same regardless of the phase angle of the input voltage Vin, the effect when the phase angle of the input voltage Vin is small will not be excessively larger than at any other time.

Thus, as shown in FIG. 11, for example, the frequency reduction circuit 20 turns the switching element 4 ON the first time that zero current is detected in the quasi-resonant waveform after the switching element 4 has been turned OFF during a heavy load. Furthermore, the frequency reduction circuit 20 turns ON the switching element 4 the second time that zero current is detected after the switching element 4 has been turned OFF during a medium load, and the frequency reduction circuit 20 turns ON the switching element 4 the third time that zero current is detected after the switching element 4 has been turned OFF during a light load. By delaying the turn-ON timing of the switching element 4 in such a manner as the load becomes lighter, the frequency reduction circuit 20 reduces the switching frequency Fc and thus prevents increases in switching losses when the load is light.

An AC cycle detection circuit 30 included in the control circuit 10 has the function of detecting the cycle of the input voltage Vin and keeping the load state detection results of the frequency reduction circuit 20 for one cycle of the input voltage Vin. As shown in FIG. 12, for example, the AC cycle detection circuit 30 includes: a one-shot circuit 31 that receives the signal (an ON-OFF control signal for the switching element 4) 51 output by the flip-flop 18 and outputs a pulse signal when the signal 51 decreases; and a switch element 32 that conducts (turns ON) upon receiving the output of the one-shot circuit 31.

The switch element 32 is formed of an nMOSFET, for example, and charges a capacitor 33 upon reading an IS current detection voltage S2 provided to the terminal IS. The AC cycle detection circuit 30 is configured so as to detect the cycle of the input voltage Vin (a half-cycle of the input alternating current voltage AC) by comparing in a comparator 34 the charging voltage of the capacitor 33 and a determination voltage Vprd that is set somewhat higher than a preset value (0V), and then output a signal S3 (one cycle for the L (low) level and H level of this signal being identical to one cycle of the input voltage Vin) that indicates the cycle of the input voltage Vin.

RELATED ART DOCUMENTS

Patent Documents

Patent Document 1: Japanese Patent Application Laid-Open Publication No. 2014-82924
Patent Document 2: Japanese Patent Application Laid-Open Publication No. 2014-23208

SUMMARY OF THE INVENTION

However, even if the turn-ON timing of the switching element 4 is controlled by controlling the number of times zero current detection is performed by the frequency reduction circuit 20 in the above-described manner, it may be difficult for the comparator 14 to detect zero current, depending on the size of the input alternating current voltage and the design specifications of the switching power supply device 1. Specifically, for example, depending on the design specifications of the power supply device, the resonance voltage becomes smaller when the ratio between the number of coils in the inductor 3 and the number of coils in the auxiliary coil 8 becomes larger, or when the input voltage Vin is large and the difference with the output direct current voltage Vout is small. In such cases, the signal voltage for zero current detection that is detected via the auxiliary coil 8 becomes smaller as the resonance voltage of the inductor 3 becomes smaller; thus, as shown in FIG. 13, for example, it may be difficult for the comparator 14 to detect zero current.

When such a situation occurs, it is no longer possible to set the flip-flop 18 via zero current detection, and it is thus no longer possible to turn the switching element 4 ON at the appropriate time. FIG. 13 shows a medium load state in which the turn-ON timing of the switching element 4 is controlled so as to occur the second time that zero current is detected.

To address such a situation, the above-mentioned restart timer 40 is provided in order to reliably turn the switching element 4 ON and continuously perform switching. However, the restart timer 40 is generally configured so as to set the flip-flop 18 at a preset zero current detection timing during basic switching operations. Thus, there is a discrepancy between when the flip-flop 18 is set via the restart timer 40 and when the flip-flop 18 is set when the frequency reduction circuit 20 detects zero current for the second time.

In other words, when the switching element 4 is turned OFF during a medium load, the difference between the input voltage Vin and the output direct current voltage Vout is small near the peak of the input voltage Vin, thus meaning that the resonance current that flows to the inductor 3 becomes smaller. In such a case, it is no longer possible for the comparator 14 to perform zero current detection; thus, the switching element 4 is turned ON by having the flip-flop 18 be set by the restart timer 40 instead of by the frequency reduction circuit 20.

As a result, in a region near the peak of the inductor current in FIG. 13, the flip-flop 18 is set via the output of the restart timer 40 at a timing that is later than the timing at which the flip-flop 18 is set via the output of the frequency reduction circuit 20. When this happens, the results in this region do not match the results when the switching frequency is reduced by adjusting the turn-ON timing of the switching element 4 via the above-mentioned zero current detection in regions not near the peak; thus, input current near the peak of the input voltage Vin decreases resulting in a discrepancy in the current flowing to the inductor 3, which leads to a new problem in which a power factor reduction effect is diminished.

The present invention was designed with the above-mentioned circumstances in mind, and an aim thereof is to provide a switching power supply device that can prevent decreases in the power factor even when the load becomes light and zero current detection is no longer possible. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply device, including: an inductor connected to a rectifier circuit that rectifies an input alternating current voltage; a switching element that forms a current path that passes from the rectifier circuit to the switching element through the inductor when the switching element is ON; an output capacitor connected in parallel to an output node; a diode that forms a current path between the inductor and the output capacitor when the switching element is OFF, thereby establishing an output direct current voltage to the output capacitor; and a control circuit that controls current that flows to the inductor by turning the switching element ON and OFF, wherein the control circuit includes: an ON width control part that controls an ON width of the switching element in accordance with an error signal in which a difference between a reference voltage and the output direct current voltage has been amplified; a load state detection part that detects a magnitude of a load to which the output direct current voltage is provided; a zero-current detection and frequency reduction part that detects a timing of detecting zero-current that is defined as a timing at which current flowing to the inductor becomes lower than a prescribed zero-current detection value while the switching element is OFF and then causes the switching element to turn ON at the detected timing, wherein when the magnitude of the load detected by the load state detection part is determined to be relatively small, the zero-current detection and frequency reduction part reduces a switching frequency of the switching element by detecting a second or subsequent event of detecting the zero-current detection as the timing that triggers the turning-ON of the switching element; a restart timer that, when the zero-current detection and frequency reduction part fails to detect the timing that triggers the turning-ON of the switching element before the restart timer counts up a prescribed time, causes the switching element to turn ON at a timing of the count-up, the restart timer including a timer adjustment part that lengthen the prescribed time when the magnitude of the load detected by the load state detection part is determined to be relatively small so as to make the turning-ON timing of the switching element by the restart timer substantially correspond to a timing at which the zero-current detection and frequency reduction part would have detected the timing that triggers the turning-ON of the switching element.

The control circuit is configured so as to include: the ON width control part that controls an ON width of the switching element in accordance with an error signal in which a difference between a reference voltage and the output direct current voltage has been amplified; and the zero-current detection and frequency reduction part that detects a timing of when current flowing to the inductor becomes zero while the switching element is OFF and then turns the switching element ON.

In order to achieve the above-mentioned aim in particular, the switching power supply device according to one aspect of the present invention further includes, in the control circuit: the load state detection part that detects a weight of a load to which the output direct current voltage is provided; the zero-current detection and frequency reduction part that, when a light load state is detected by the load state detection part, reduces a switching frequency of the switching element by delaying a turn-ON timing of the switching element by the zero-current detection and frequency reduction part; the restart timer that, in place of the zero-current detection and frequency reduction part, turns the switching element ON when the zero-current detection and frequency reduction part is unable to turn the switching element ON; and the timer adjustment part that lengthens a restart time of the restart timer so as to synchronize with the turn-ON timing of the switching element that has been delayed by the zero-current detection and frequency reduction part.

It is preferable that the load state detection part divide the magnitude of the load into multiple categories and determine which one of the multiple categories the detected magnitude of the load belongs to, and that the zero-current detection and frequency reduction part select one of a first, second or any subsequent events of detecting the zero-current as the timing that triggers the turning-ON of the switching element, in accordance with the determined category of the load.

Specifically, it is preferable that the load state detection part divide the magnitude of the load into three categories: a heavy load state, a medium load state, and a light load state, and determine which one of the states the detected magnitude of the load belongs to, and that the zero-current detection and frequency reduction part set a first event of detecting the zero-current while the switching element is turned OFF as the timing that triggers the turning-ON of the switching element when the load is in the heavy load state, a second event of detecting the zero-current while the switching element is turned OFF as the timing that triggers the turning-ON of the switching element when the load is in the medium load state, and a third event of detecting the zero-current while the switching element is turned OFF as the timing that triggers the turning-ON of the switching element when the load is in the light load state.

It is preferable that the timer adjustment part adjust the prescribed time by changing a charging current to a capacitor that determines the prescribed time in accordance with the detected magnitude of the load, the restart timer including a timer adjustment part that lengthens the prescribed time when the magnitude of the load detected by the load state detection part is determined to be relatively small so as to make the turning-ON timing of the switching element by the restart timer substantially correspond to a timing at which the zero-current detection and frequency reduction part would have detected the timing that triggers the turning-ON of the switching element.

In a switching power supply device configured in such a manner, when the turn-ON timing of the switching element via zero current detection is delayed in accordance with the weight of the load, the restart time set by the restart timer is set so as to be longer so as to match the turn-ON timing of the switching element. Specifically, the restart time is set such that the turn-ON timing of the switching element via zero current detection and the turn-ON timing of the switching element via the restart timer match. Therefore, even when the load is light, the turn-ON timing of the switching element determined by the output of the restart timer will not be unsatisfactorily fast or slow.

As a result, according to a switching power supply device of the present invention, it is possible to reliably prevent decreases in the power factor that result from decreases in the switching frequency even when it is not possible to determine the turn-ON timing of the switching element via zero current detection. In particular, since it is possible to prevent a decrease in the power factor when the load is light by merely changing the restart time of the restart timer in accordance with the weight of the load, such a power supply device has many practical effects. It is to be understood that both the foregoing general description and the following detailed description are exemplary and explanatory, and are intended to provide further explanation of the invention as claimed.

BRIEF DESCRIPTION OF THE DRAWINGS

FIGS. 8A to 8D show the basic operation of the switching power supply device shown in FIG. 7.

DETAILED DESCRIPTION OF EMBODIMENTS

A switching power supply device according to an embodiment of the present invention will be explained hereafter with reference to the drawings.

Figure 1:
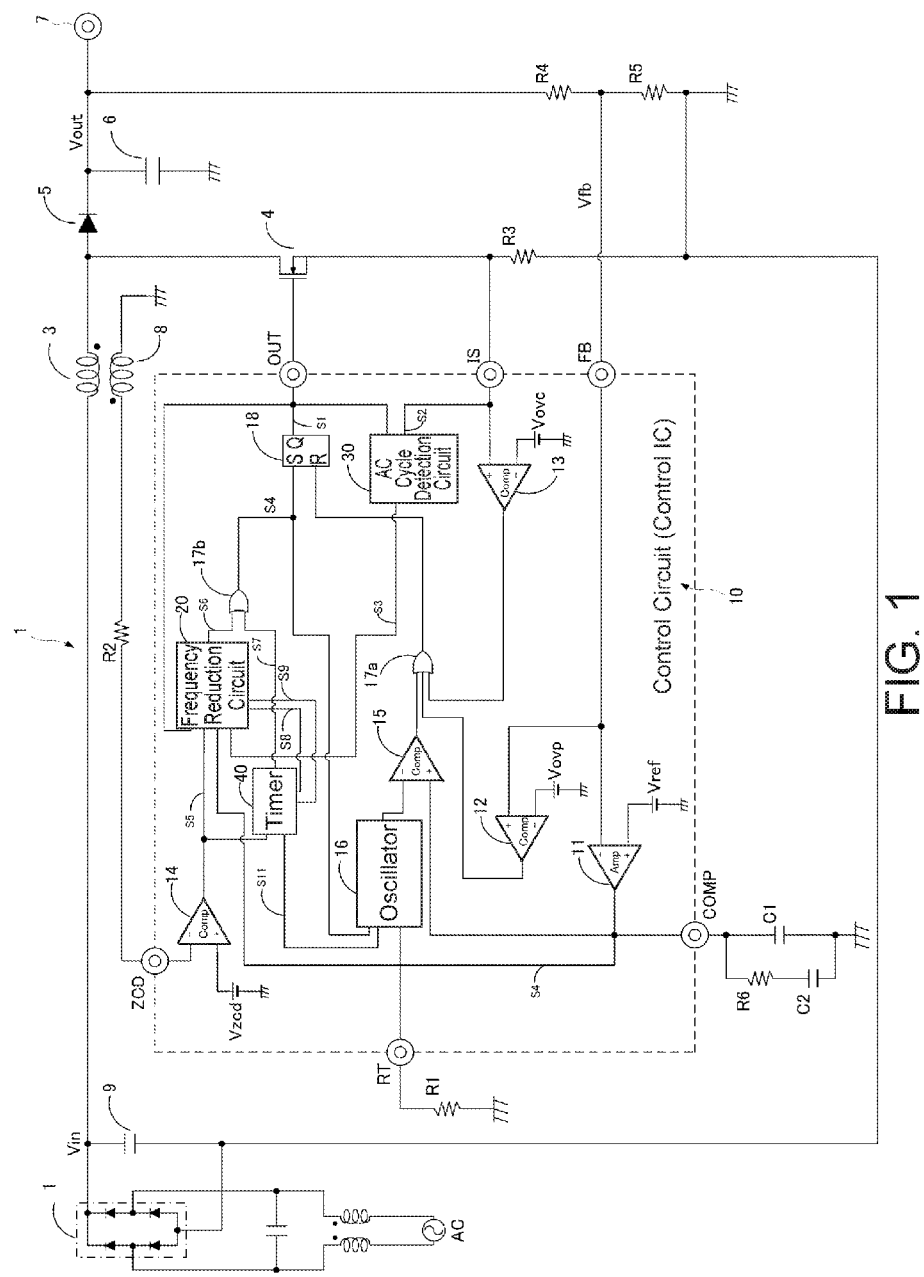
FIG. 1 is an overall schematic configuration diagram of a switching power supply device according to an embodiment of the present invention.
Figure 7:
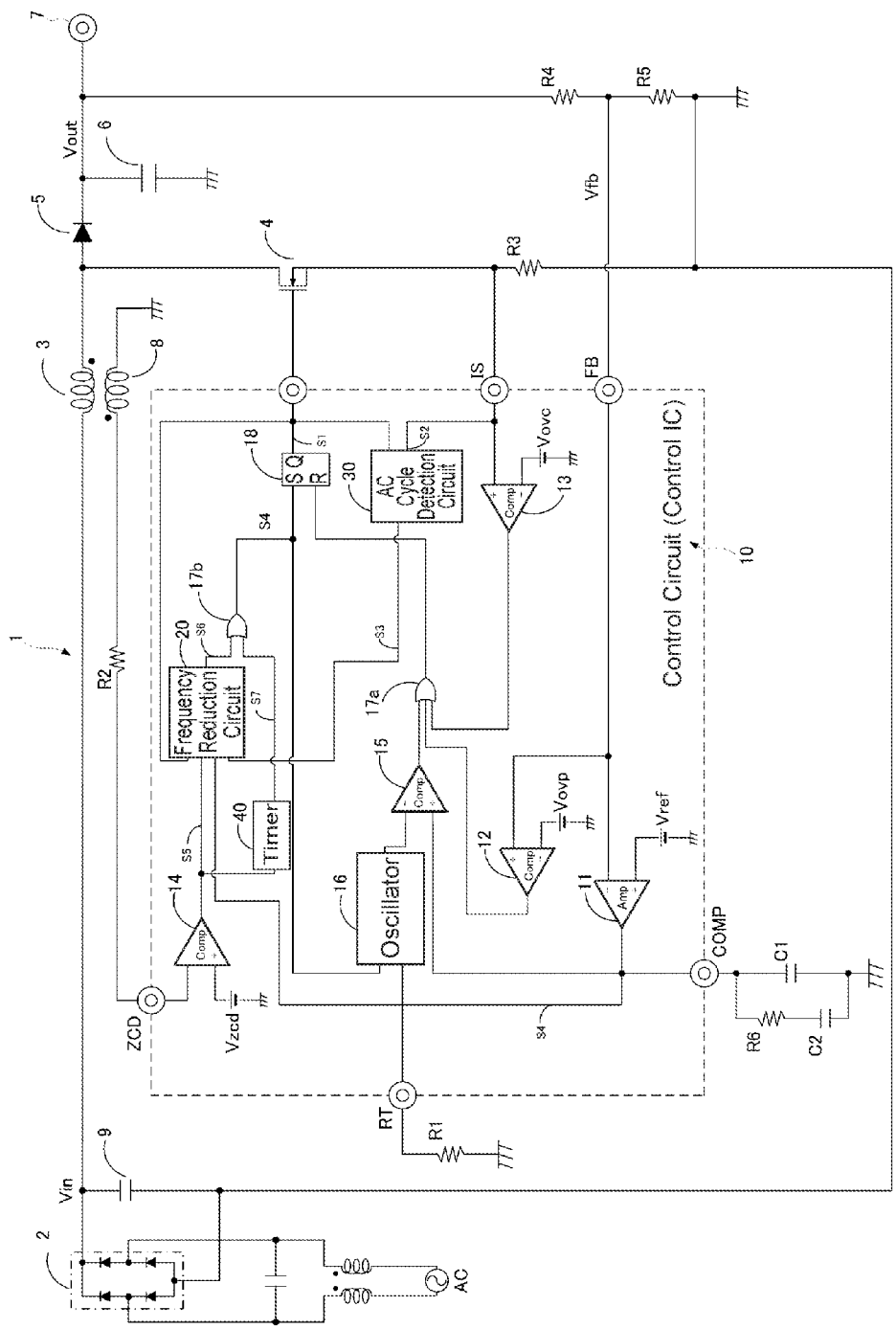
FIG. 7 is a schematic configuration diagram that shows one example of a conventional switching power supply device that includes a power factor control function realized by reducing the switching frequency.
Figure 9:
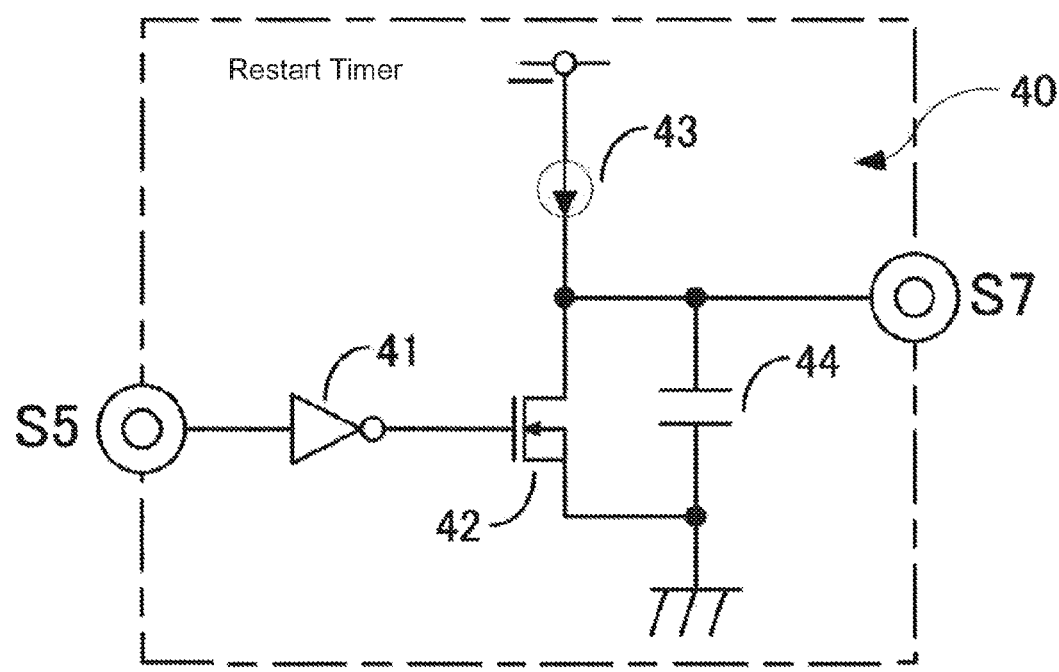
FIG. 9 shows an example configuration of the restart timer 40 in the switching power supply device shown in FIG. 7.
Figure 10:
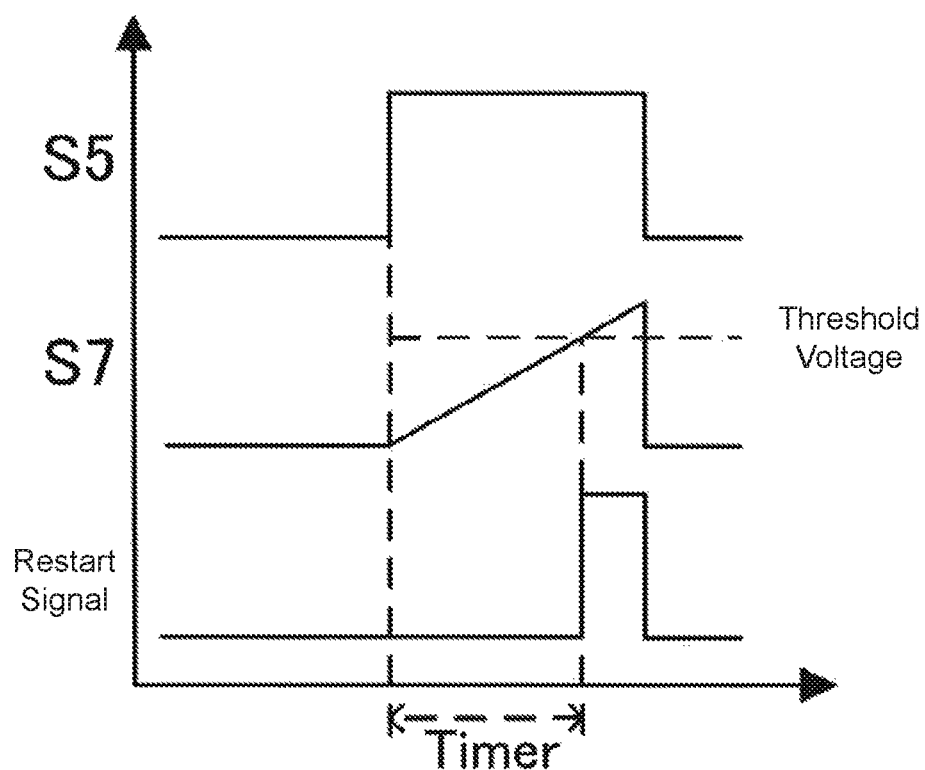
FIG. 10 is a timing diagram that shows the operation of the restart timer 40 shown in FIG. 9.
Figure 11:
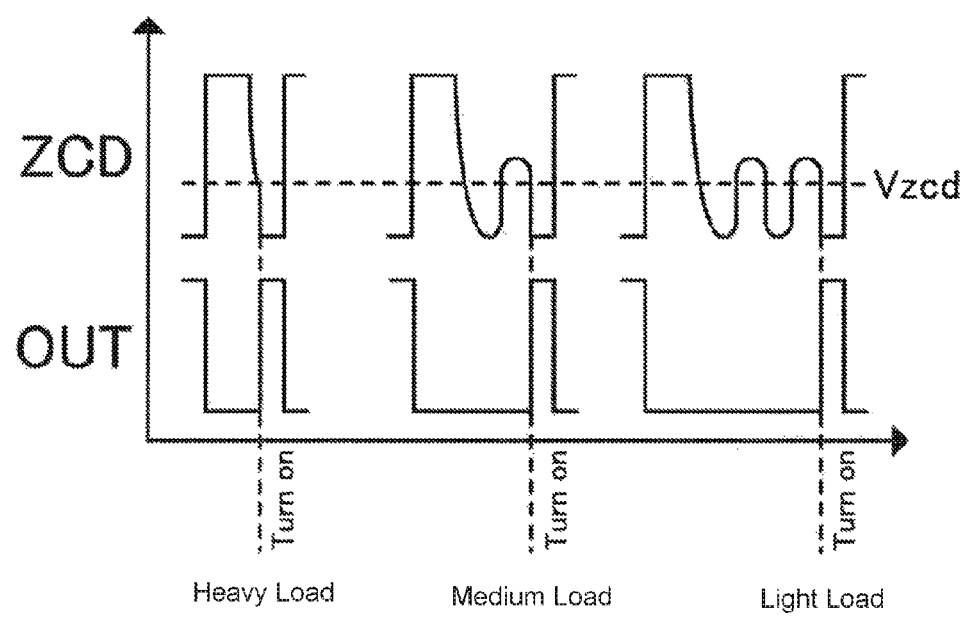
FIG. 11 shows an operation of the frequency reduction circuit 20 that is based on the weight of the load.
Figure 12:
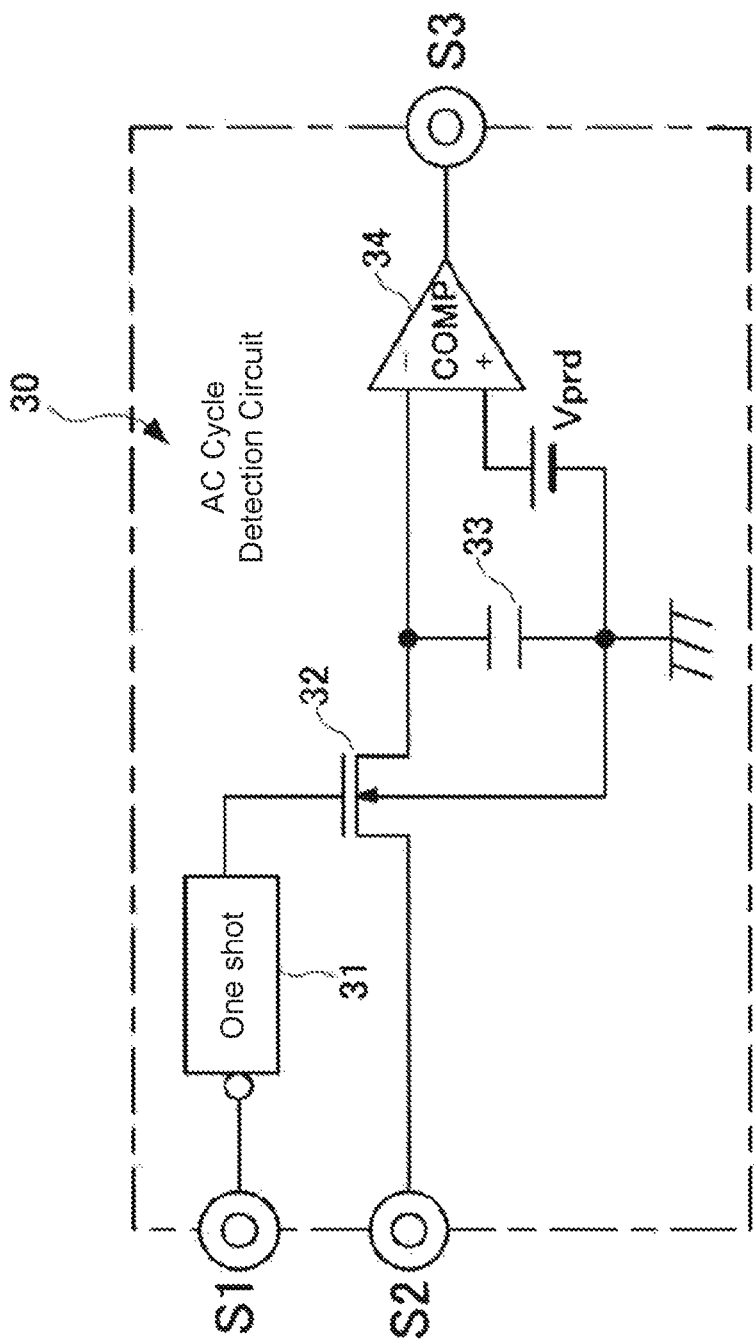
FIG. 12 shows an example configuration of the AC cycle detection circuit 30 in the switching power supply device shown in FIG. 7.

FIG. 1 is a schematic configuration diagram of a switching power supply device 1 according to an embodiment of the present invention. Constituent portions similar to those of the conventional switching power supply device 1 shown in FIG. 7 are assigned the same reference characters and descriptions thereof are omitted.

This switching power supply device 1 is characterized by being configured so as to set the turn-ON timing of a switching element 4 via a restart timer 40 so as to match the turn-ON timing of the switching element 4 via zero current detection by changing a restart time of the restart timer 40 in accordance with the weight of a load. Specifically, the switching power supply device 1 is characterized by including a timer adjustment part that lengthens the restart time of the restart timer 40 so as to match the turn-ON timing of the switching element 4, which has been delayed by a frequency reduction circuit 20.

Furthermore, the switching power supply device 1 of this embodiment prevents the occurrence of discrepancies between a case in which the switching element 4 is turned ON in accordance with zero current detection and a case in which the switching element 4 is turned ON using a restart signal, with these discrepancies occurring in the resonance period of the current in the quasi-resonant circuit that flows through an inductor 3 as a result of changes in the weight of the load. As a result, an increase in losses at the switching element 4 and a decrease in the power factor are prevented.

As shown in FIG. 1, the switching power supply device 1 according to the present invention generally provides signals S8, S9, which indicate the weight of the load and are used to determine zero current detection timing in the frequency reduction circuit 20, to the restart timer 40. Furthermore, the restart timer 40 is configured so as to change the restart time at which a signal S7 is generated based on the signals S8, S9 provided from the frequency reduction circuit 20.

Figure 2:
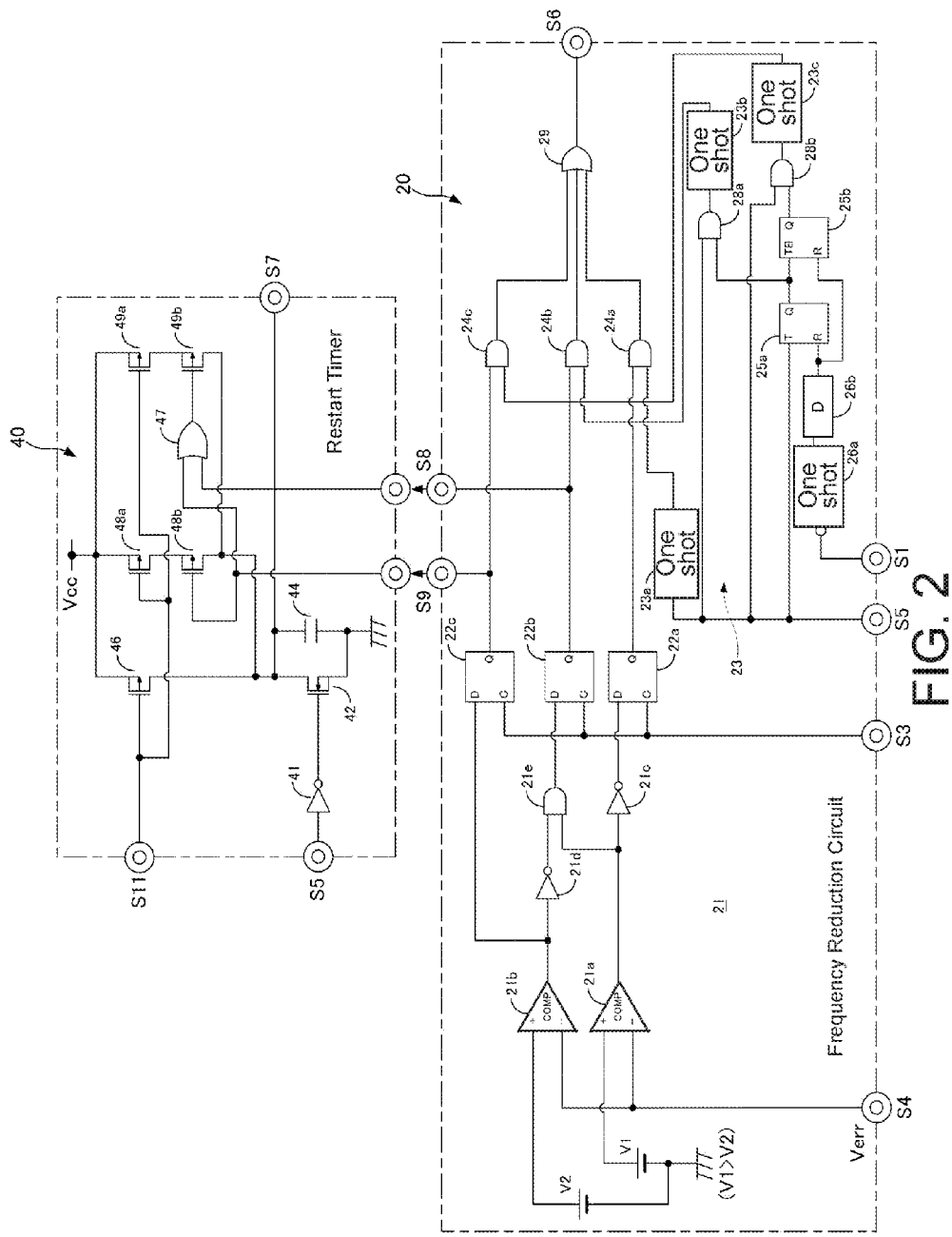
FIG. 2 shows an example configuration of a frequency reduction circuit and a restart timer in the switching power supply device shown in FIG. 1.

Specifically, the frequency reduction circuit (frequency reduction part) 20 and the restart timer 40 are configured as shown in FIG. 2, for example. In other words, as shown in FIG. 2, the frequency reduction circuit 20 is configured so as to include at a first stage a load state detection circuit (load state detection part) 21 that detects the weight of the load (the load state). The load state detection circuit 21 includes first and second comparators 21a, 21b that respectively compare a signal S4 that represents an error signal Verr and respective preset load state detection thresholds V1, V2 (V1>V2). The load state detection circuit 21 is configured so as to perform logic processing on the respective outputs of the first and second comparators 21a, 21b via a logic circuit formed of two inverter circuits 21c, 21d and an AND circuit 21e, thereby obtaining a load state detection signal that corresponds to the weight of the load.

The signal S4 that represents the error signal (error voltage) Verr is formed of a signal in which the voltage value increases as the load becomes heavier and the voltage value decreases as the load becomes lighter. Therefore, when the load is heavy and the error voltage Verr provided as the signal S4 exceeds the respective load state detection thresholds V1, V2, (Verr>V1>V2), the outputs of the first and second comparators 21a, 21b are respectively "L." This state is a heavy load detection state.

When the load becomes somewhat lighter and the error voltage Verr is less than the load state detection threshold V1 (V1>Verr>V2), the output of the first comparator 21a switches to "H." The output of the second comparator 21b remains "L," however. This state is a medium load detection state.

When the load becomes even lighter and the error voltage Verr is less than the load state detection threshold V2 (V1>V2>Verr), the output of the second comparator 21b switches to "H." The output of the first comparator 21a remains "H," however. This state is a light load detection state.

The output of the first comparator 21a, which indicates the load state detected in such a manner, is inverted via the inverter circuit 21c, and is provided to a first D flip-flop 22a. In addition, the output of the second comparator 21b is inverted via the inverter circuit 21d, and AND (logical product) processing is carried out between this output and the output of the first comparator 21a by the AND circuit 21e, after which this output is provided to a second D flip-flop 22b. The output of the second comparator 21b is provided to a third D flip-flop 22c.

The first to third D flip-flops 22a, 22b, 22c perform a latch operation using as a trigger a signal S3 provided by an AC cycle detection circuit 30. Therefore, when a heavy load is detected, the first to third D flip-flops 22a, 22b, 22c are set to "H, L, L." When a medium load is detected, the first to third D flip-flops 22a, 22b, 22c are set to "L, H, L." When a light load is detected, the first to third D flip-flops 22a, 22b, 22c are set to "L, L, H." In other words, only the first flip-flop 22a is set to "H" when a heavy load is detected, only the second flip-flop 22b is set to "H" when a medium load is detected, and only the third flip-flop 22c is set to "H" when a light load is detected.

The cycle of the signal S3 provided from the AC cycle detection circuit 30 is, as described above, identical to one cycle of the input voltage Vin (a half-cycle of the alternating current input voltage). Therefore, the respective outputs of the first to third flip-flops 22*a*, 22*b*, 22*c* set in the above-described manner are respectively held for one cycle of the input voltage Vin.

The frequency reduction circuit 20 includes, in addition to the above-mentioned load state detection circuit 21, a delay control circuit 23 that generates a signal S6 that delay-controls the turn-ON timing of the switching element 4 in accordance with the load state information held in the respective flip-flops 22*a*, 22*b*, 22*c*. The delay control circuit 23 includes two-stage toggle flip-flops 25*a*, 25*b* that delay a signal 51 that drives the ON-OFF of the switching element 4 by a prescribed timing.

These toggle flip-flops 25*a*, 25*b* are respectively reset via a signal in which one pulse signal generated by a one-shot circuit 26*a*, which received the reversed signal of the signal 51, is further delayed for a prescribed period of time by a delay circuit 26*b*. In other words, the toggle flip-flops 25*a*, 25*b* are reset at a delay after the switching element 4 turns OFF. The first stage toggle flip-flop 25*a* switches states during the first rise of a signal S5 from a comparator 14 after the switching element 4 turns OFF, and changes the Q output to the H level. The Q output of the toggle flip-flop 25*a* changes to the L level during the second rise of the signal S5 from the comparator 14. For the second stage toggle flip-flop 25*b*, the input of a terminal TB (a negative logic toggle input) changes from the H level to the L level during the second rise of the signal S5 from the comparator (zero current detector) 14, and thus changes the Q output to the H level.

The signal S5, which is output by the comparator (zero current detector) 14 when the comparator 14 detects zero current, is provided to a first one-shot circuit 23*a*, and is also provided to a second one-shot circuit 23*b* and a third one-shot circuit 23*c*, respectively, via respective AND circuits 28*a*, 28*b*. The AND circuits 28*a*, 28*b* are active at respectively different times upon receiving the Q output of the previously-mentioned first and second stage toggle flip-flops 25*a*, 25*b*.

Therefore, when the signal S5 is received, the first one-shot circuit 23*a* first generates a pulse-shaped gate control signal that is synchronized with the signal S5. Thereafter, when the first rise of the signal S5 from the comparator 14 after the switching element 4 has turned OFF is generated, the second one-shot circuit 23*b* generates a pulse-shaped gate control signal during the next, or in other words, second, rise of the signal S5. Furthermore, the third one-shot circuit 23*c* generates a pulse-shaped gate control signal during the third rise of the signal S5.

The pulse-shaped gate control signals generated at mutually different times by the one-shot circuits 23*a*, 23*b*, 23*c* are alternatively selected by the Q outputs of the flip-flops 22*a*, 22*b*, 22*c* and AND circuits 24*a*, 24*b*, 24*c*, and are output as the signal S6 that controls the turn-ON timing of the switching element 4 via an OR circuit 29.

In other words, when the load is heavy, only the flip-flop 22*a* is set to "H"; thus, the signal S6 that turns the switching element 4 ON is output when zero voltage is detected for the first time after the switching element 4 has turned OFF. In addition, when there is a medium load, only the flip-flop 22*b* is set to "H"; thus, the signal S6 that turns the switching element 4 ON is output when zero voltage is detected for the second time after the switching element 4 has turned OFF. Furthermore, when the load is light, only the flip-flop 22*c* is set to "H"; thus, the signal S6 that turns the switching element 4 ON is output when zero voltage is detected for the third time after the switching element 4 has turned OFF.

The restart timer 40 is configured so as to change the restart time in accordance with the output of the above-mentioned load state detection circuit 21 in the frequency reduction circuit 20. Specifically, in the restart timer 40, the signals set by the second and third D flip-flops 22*b*, 22*c*, respectively, are input as the signals S8, S9 that indicate the load state. These signals S8, S9 are, as described above, "L, L" when the load is heavy, "H, L" when there is a medium load, and "L, H" when the load is light.

Figure 13:
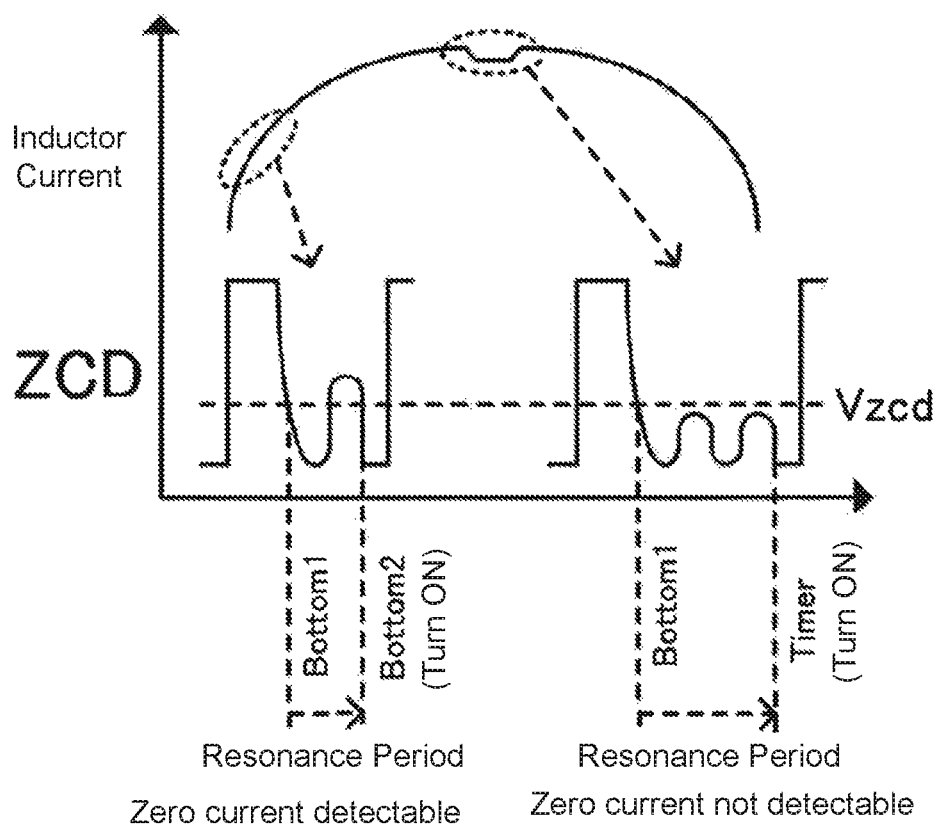
FIG. 13 shows zero current detection of an inductor current that changes according to the phase (size) of the input voltage Vin.

As shown in FIG. 2, the restart timer 40 includes: a capacitor 44 that is charged by being provided a prescribed current; and an nMOSFET 42 that is connected in parallel to the capacitor 44 and is used as switch that releases electric charge that was used to charge the capacitor 44. The MOSFET 42 is turned ON via a signal in which the signal S5 was inverted via an inverter circuit 41. Therefore, during the period in which zero current is detected by the comparator 14, the MOSFET 42 turns OFF and the capacitor 44 is charged, and when it is determined that the voltage of the ZCD terminal has become somewhat large and that there is not zero current, the MOSFET 42 turns on and the capacitor 44 discharges. Consequently, when a period occurs such as that in FIG. 13 in which it is not possible to perform zero current detection, the charging voltage of the capacitor 44 continues to increase. This charging voltage of the capacitor 44 is output as the signal S7 for generating a restart signal.

The restart timer 40 includes in parallel pMOSFETs 46, 48*a*, 49*a* that respectively receive at the gate thereof the voltage of a signal S11 provided from an oscillator 16, and that function as current sources that pass a fixed current that is determined by the voltage of the signal S11. In particular, the current that flows to the MOSFET 46 is directly provided to the capacitor 44. In addition, the current that flows to MOSFETs 48*a*, 49*a* is directly provided to the capacitor 44 via the respective pMOSFETs 48*b*, 49*b* that function as switches. The MOSFET 48*b* is configured to perform an ON operation upon receiving the signal S9, and the MOSFET 49*b* is configured to perform an ON operation after receiving the signal S8 or the signal S9 via an OR circuit 47. These MOSFETs 48*b*, 49*b* function as the timer adjustment part of the restart timer 40.

Therefore, when the load is heavy, the MOSFETs 48*b*, 49*b* are respectively ON; thus, the capacitor 44 is charged via current provided from the respective MOSFETs 46, 48*a*, 49*a*. When there is a medium load, the MOSFET 49*b* is ON and the MOSFET 48*b* is OFF; thus, the capacitor 44 is charged via current provided from the respective MOSFETs 46, 49*a*. When the load is light, the MOSFETs 48*b*, 49*b* are both OFF; thus, the capacitor 44 is charged via only the current provided from the MOSFET 46.

As a result, the period of time for the charging voltage of the capacitor 44 to reach a prescribed threshold voltage of an input terminal of an OR circuit 17*b*, or in other words, the charging time of the capacitor 44, is fastest when the load is heavy, and is slower when there is a medium load compared to when there is a heavy load. The charging time of the capacitor 44 is slower when there is a light load compared to when there is medium load. In this manner, by changing the charging current of the capacitor 44 and modifying the charging time of the capacitor 44 in accordance with the load state, the restart time is modified in accordance with the load state. As a result, a restart signal is generated at a timing that is in accordance with the turn-ON timing of the switching element 4, which is set as a first zero current detection, a second zero current detection, or a third zero current detection in accordance with the previously-mentioned load state.

The values of the current provided from the respective MOSFETs 46, 48a, 49a may be obtained by performing calculations ahead of time, using a constant for the quasi-resonance, such that the amount of time for the charging voltage of the capacitor 44 to reach the prescribed OR circuit 17b input terminal threshold voltage of the input terminal of the OR circuit 17b matches the zero current detection timing.

Figure 3:
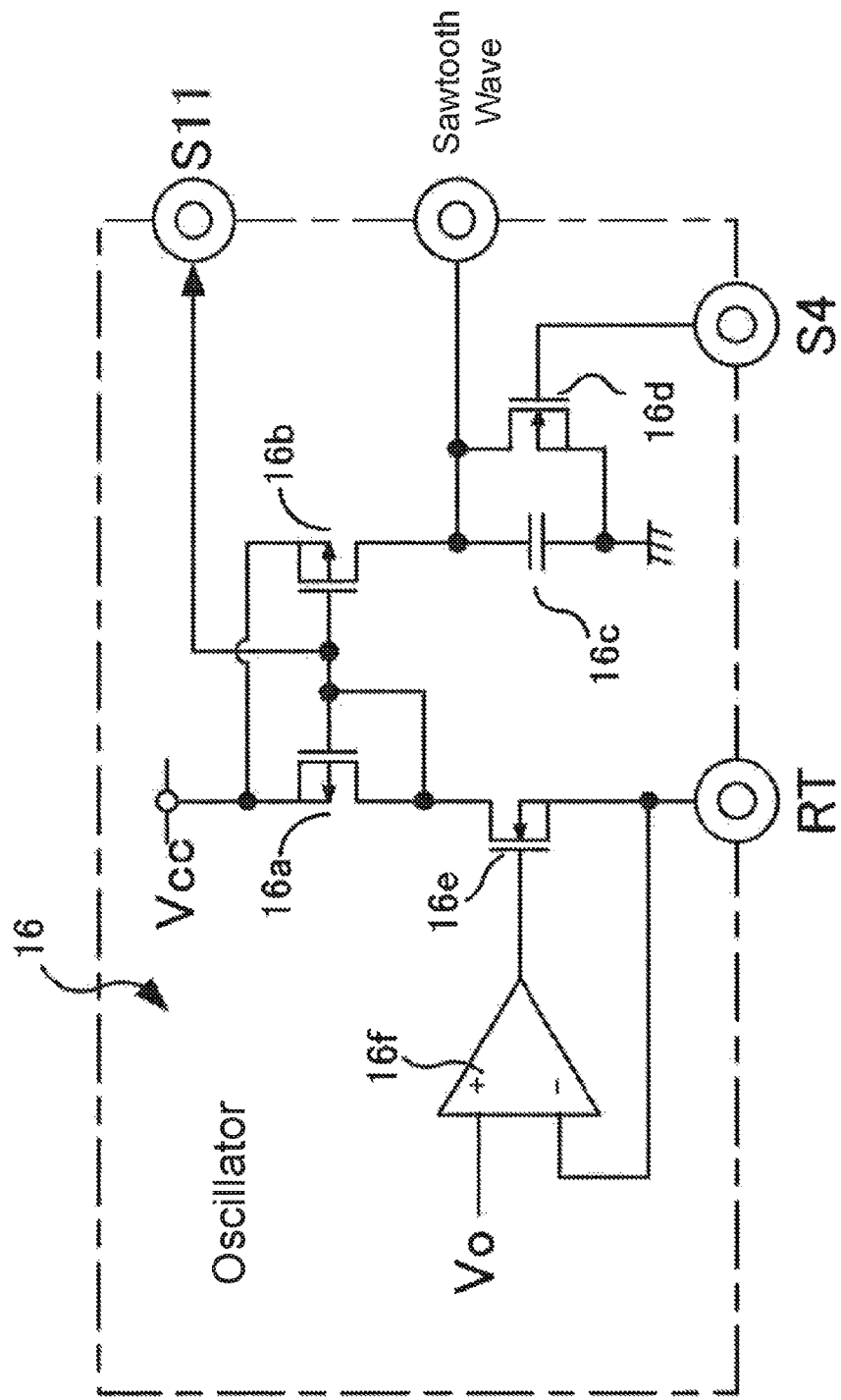
FIG. 3 shows an example configuration of an oscillator in the switching power supply device shown in FIG. 1.

Next, a simple description of the oscillator 16 that generates a sawtooth wave will be given. As shown in FIG. 3, for example, the oscillator 16 basically includes a capacitor 16c that is charged by being providing a prescribed current via a current mirror circuit formed of a pair of pMOSFETs 16a, 16b and that generates a sawtooth wave as the charging voltage thereof. The oscillator 16 is configured so as to include an nMOSFET 16d that is connected in parallel to the capacitor 16c and that resets the sawtooth wave by releasing electric charge charged to the capacitor 16c when the signal S4 (the output signal of the OR circuit 17b) reaches the H level.

The current that flows to the MOSFET 16a of the current mirror circuit is set using a reference voltage Vo and a resistor R1 that is externally attached to a terminal RT. In other words, a pMOSFET 16e, of which the source is connected to the terminal RT, operates by receiving at the gate thereof the output of an operational amplifier 16f that causes the prescribed reference voltage Vo and the source of the MOSFET 16e to virtually short-circuit. As a result, the source voltage of the MOSFET 16e (the voltage of the terminal RT) is set to the reference voltage Vo.

Therefore, when the resistance value of the resistor R1 externally attached to the terminal RT is r, a fixed current defined as Vo/r flows to the MOSFET 16a of the current mirror circuit, and a current that is proportional to this fixed current is provided to the capacitor 16c via the MOSFET 16b. The gate voltage of the MOSFETs 16a, 16b in the oscillator 16 configured in such a manner is applied to the restart timer 40 as the signal S11. Therefore, the current that flows to the respective above-mentioned MOSFETs 46, 48a, 49a in the restart timer 40 is also proportional to the fixed current that flows to the MOSFET 16a in the current mirror circuit.

Figure 4:
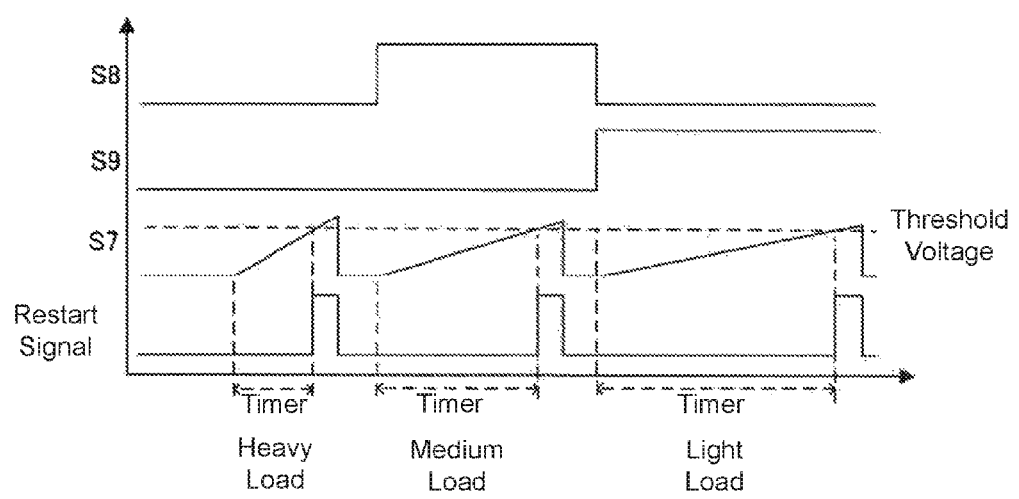
FIG. 4 shows an operation of the restart timer that is based on the weight of the load.

FIG. 4 shows the state of the restart signal and the signals S8, S9, which are based on the weight of the load, of the switching power supply device 1 that is configured so as to include the frequency reduction circuit 20 and the restart timer 40 configured in the manner shown in FIG. 2. In other words, the signals S8, S9 that indicate the state of the load are "L, L" when the load is heavy, "H, L" when there is a medium load, and "L, H" when the load is light. The charging current of the capacitor 44 in the restart timer 40 is changed in accordance with changes in the signals S8, S9, and the charging voltage (the signal S7) of the capacitor 44 changes as shown in FIG. 4.

As a result, the timing (time period for the restart timer) of the generation of a restart signal, which is generated upon determining that the signal S7 is at a prescribed threshold, changes in accordance with the weight of the load, and as shown in FIG. 4, the amount of time from when the switching element 4 is turned ON until the restart signal is output becomes longer as the load becomes lighter.

Therefore, in the switching power supply device 1 that is configured so as to prevent decreases in the power factor when the load is light by changing the timing of zero current detection in accordance with the weight of the load, it is possible, even when it is difficult for zero current detection to be carried out, to reliably turn the switching element 4 ON using a restart signal without adversely affecting the resonance conditions through the inductor 3.

Figure 5:
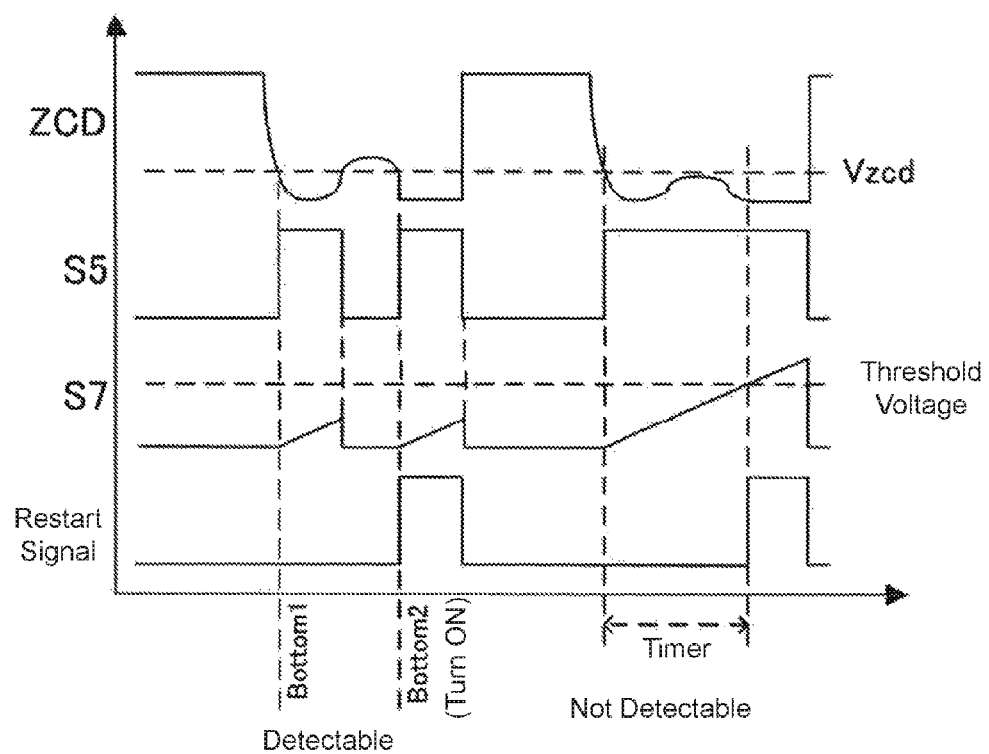
FIG. 5 shows a turn-ON operation of a switching element 4 during a medium load.

FIG. 5 shows an operational state when the switching element 4 is turned ON in a case where there is a medium load. In such a case, the turning ON of the switching element 4 via zero current detection is carried out the second time that zero current is detected. However, even when the resonance voltage becomes smaller and zero current can no longer be detected, according to the switching power supply device 1 having the above-described configuration, a restart signal is output at a timing when the second time that zero current would have been detected, as shown in FIG. 5. As a result, it is possible to reliably turn the switching element 4 ON at a timing when the voltage applied to the switching element 4 is smallest.

Figure 6:
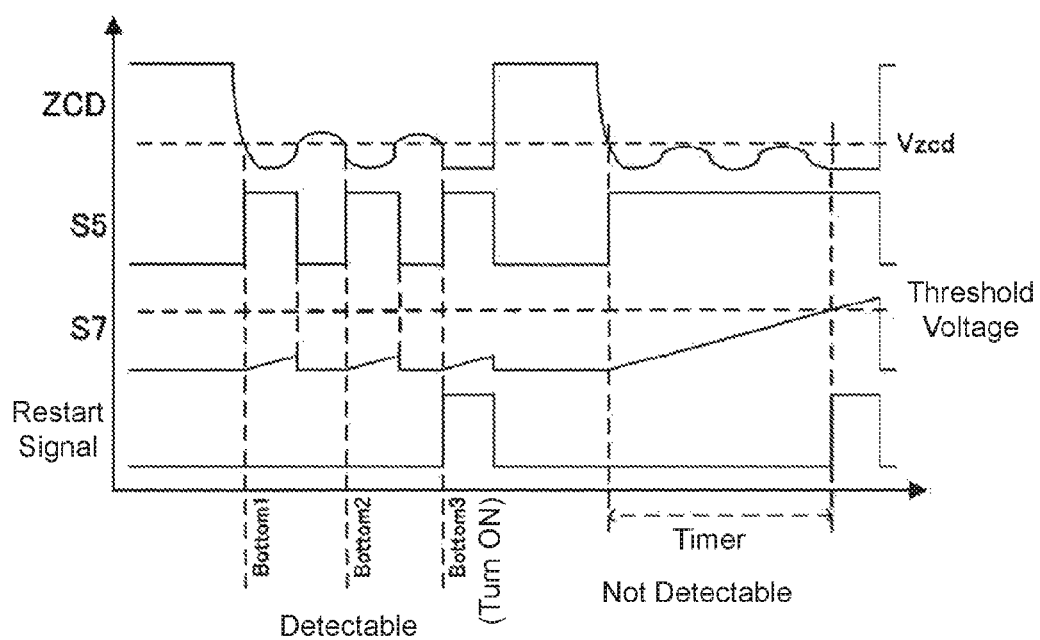
FIG. 6 shows the turn-ON operation of the switching element 4 during a light load.

FIG. 6 shows an operational state in a case where the switching element 4 is turned ON during a light load. In such a case, the turning ON of the switching element 4 via zero current detection is carried out the third time that zero current is detected. Thus, like the case of the medium load discussed above, even when zero current cannot be detected, according to the switching power supply device 1 having the above-described configuration, a restart signal is output at a timing when the third time that zero current would have been detected, as shown in FIG. 6. As a result, since the restart signal is output at a timing at which the third time zero current would have been detected when a light load state has been detected, it is possible even when the load is light to reliably turn the switching element 4 ON at a timing when the voltage applied to the switching element 4 is smallest.

Specifically, in the switching power supply device 1 with the configuration described above, the gate voltage of the MOSFET 16a in the oscillator 16 is provided to the gate of the respective MOSFETs 46, 48a, 49a in the restart timer 40 as the signal S11, thereby forming respective current mirror circuits with the MOSFET 16a. Therefore, the charging current of the capacitor 16c in the oscillator 16 is adjusted via the resistor R1 connected to the terminal RT. When the maximum ON width of the switching element 4 correspondingly changes, it is necessary to delay the timing of the output of the restart signal. In such a case as well, it is possible to change the timing of the generation of the restart signal so as to synchronize with changes in the maximum ON width. In other words, it is possible to implement the maximum ON width of the switching element 4 and the timing of the generation of the restart signal by merely adjusting the resistor R1.

In addition, even in a case in which the value of the inductor 3 is modified in accordance with the design specifications of the power source and the resonance period when the switching element 4 is turned OFF during a frequency reduction operation changes as the resonance frequency changes due to the modification of the value of the inductor 3, for example, the present invention exhibits the effect of being able to reliably turn the switching element 4 ON by merely adjusting the resistor R1, or the like.

The present invention is not limited to the embodiment described above. For example, in the embodiment, the weight of the load was detected using three levels: a heavy load, a medium load, and a light load. However, it is also possible to detect the load using four or more levels. In addition, in the embodiment, the present invention was configured so as to change the timing of the generation of the restart signal by changing the charging current of the capacitor 44. However, it is also possible to change the timing of the generation of the restart signal by configuring the invention so as to selectively charge a plurality of capacitors with different capacitances using a fixed charging current source, for example.

In addition, it is possible to configure the restart timer 40 so as to, instead of changing the charging current and the capacitance of the capacitor 44, generate a restart signal after a delay period, which is in accordance with the weight of the load, has elapsed after the switching element 4 has turned OFF by dividing a pulse signal generated at a prescribed cycle, for example. In addition, other various modifications can be made without departing from the gist of the present invention.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply device, comprising:
    an inductor connected to a rectifier circuit that rectifies an input alternating current voltage;
    a switching element that forms a current path that passes from the rectifier circuit to the switching element through said inductor when the switching element is ON;
    an output capacitor connected in parallel to an output node;
    a diode that forms a current path between the inductor and the output capacitor when the switching element is OFF, thereby establishing an output direct current voltage to the output capacitor; and
    a control circuit that controls current that flows to the inductor by turning the switching element ON and OFF, wherein said control circuit comprises:
        an ON width control part that controls an ON width of the switching element in accordance with an error signal in which a difference between a reference voltage and said output direct current voltage has been amplified;
        a load state detection part that detects a magnitude of a load to which the output direct current voltage is provided;
        a zero-current detection and frequency reduction part that detects a timing of detecting zero-current that is defined as a timing at which current flowing to the inductor becomes lower than a prescribed zero-current detection value while the switching element is OFF and then causes the switching element to turn ON at said detected timing, wherein when the magnitude of the load detected by the load state detection part is determined to be relatively small, the zero-current detection and frequency reduction part reduces a switching frequency of the switching element by detecting a second or subsequent event of detecting the zero-current detection as said timing that triggers the turning-ON of the switching element;
        a restart timer that, when the zero-current detection and frequency reduction part fails to detect said timing that triggers the turning-ON of the switching element before the restart timer counts up a prescribed time, causes the switching element to turn ON at a timing of said count-up, the restart timer including a timer adjustment part that lengthens said prescribed time when the magnitude of the load detected by the load state detection part is determined to be relatively small.

2. The switching power supply device according to claim 1,
    wherein the load state detection part divides the magnitude of the load into multiple categories and determines which one of the multiple categories the detected magnitude of the load belongs to, and
    wherein the zero-current detection and frequency reduction part selects one of a first, second or any subsequent events of detecting the zero-current as said timing that triggers the turning-ON of the switching element, in accordance with the determined category of the load.

3. The switching power supply device according to claim 1,
    wherein the load state detection part divides the magnitude of the load into three categories: a heavy load state, a medium load state, and a light load state, and determines which one of the states the detected magnitude of the load belongs to, and
    wherein the zero-current detection and frequency reduction part sets a first event of detecting the zero-current while the switching element is turned OFF as said timing that triggers the turning-ON of the switching element when the load is in the heavy load state, a second event of detecting the zero-current while the switching element is turned OFF as said timing that triggers the turning-ON of the switching element when the load is in the medium load state, and a third event of detecting the zero-current while the switching element is turned OFF as said timing that triggers the turning-ON of the switching element when the load is in the light load state.

4. The switching power supply device according to claim 1, wherein the timer adjustment part adjusts said prescribed time by changing a charging current to a capacitor that determines said prescribed time in accordance with the detected magnitude of the load.

5. The switching power supply device according to claim 1, wherein the timer adjustment part adjusts said prescribed time by changing a capacitance of a capacitor that is charged by a prescribed current to determine said prescribed time, in accordance with the detected magnitude of the load.

6. The switching power supply device according to claim 1, wherein the timer adjustment part sets said prescribed time so as to make the turning-ON timing of the switching element by the restart timer substantially match a timing at which the zero-current detection and frequency reduction part would have detected said timing that triggers the turning-ON of the switching element.

7. The switching power supply device according to claim 1, wherein the timer adjustment part lengthens said prescribed time when the magnitude of the load detected by the load state detection part is determined to be relatively small so as to make the turning-ON timing of the switching element by the restart timer substantially correspond to a timing at which the zero-current detection and frequency reduction part would have detected said timing that triggers the turning-ON of the switching element.

8. The switching power supply device according to claim 7, wherein the timer adjustment part adjusts said prescribed time by changing a charging current to a capacitor that determines said prescribed time in accordance with the detected magnitude of the load.

9. The switching power supply device according to claim 7, wherein the timer adjustment part adjusts said prescribed time by changing a capacitance of a capacitor that is charged by a prescribed current to determine said prescribed time, in accordance with the detected magnitude of the load.

* * * * *

UNITED STATES PATENT AND TRADEMARK OFFICE
CERTIFICATE OF CORRECTION

| | | |
|---|---|---|
| PATENT NO. | : 9,876,432 B2 | Page 1 of 1 |
| APPLICATION NO. | : 15/584347 | |
| DATED | : January 23, 2018 | |
| INVENTOR(S) | : Takato Sugawara | |

It is certified that error appears in the above-identified patent and that said Letters Patent is hereby corrected as shown below:

In the Specification

Column 3, Line 2, the text "a signal 51" should be changed to -- a signal S1 --.

Column 5, Line 24, the text "51 output" should be changed to -- S1 output --.

Column 5, Line 25, the text "the signal 51" should be changed to -- the signal S1 --.

Signed and Sealed this
Twentieth Day of March, 2018

Andrei Iancu
*Director of the United States Patent and Trademark Office*